United States Patent
Zhong et al.

(10) Patent No.: US 12,494,145 B2
(45) Date of Patent: Dec. 9, 2025

(54) ELECTROCHROMIC DEVICE, PREPARATION METHOD THEREFOR AND APPLICATION THEREOF

(71) Applicant: SHENZHEN GUANGYI TECH CO., LTD., Shenzhen (CN)

(72) Inventors: Zhuohong Zhong, Shenzhen (CN); Jiazhi He, Shenzhen (CN)

(73) Assignee: SHENZHEN GUANGYI TECH CO., LTD., Shenzhen (CN)

( * ) Notice: Subject to any disclaimer, the term of this patent is extended or adjusted under 35 U.S.C. 154(b) by 671 days.

(21) Appl. No.: 17/786,178

(22) PCT Filed: Dec. 14, 2020

(86) PCT No.: PCT/CN2020/136000
§ 371 (c)(1),
(2) Date: Jun. 16, 2022

(87) PCT Pub. No.: WO2021/121172
PCT Pub. Date: Jun. 24, 2021

(65) Prior Publication Data
US 2023/0021421 A1    Jan. 26, 2023

(30) Foreign Application Priority Data

Dec. 17, 2019   (CN) .......................... 201911305012.4

(51) Int. Cl.
*G09G 3/19*   (2006.01)
*G02F 1/155*   (2006.01)

(52) U.S. Cl.
CPC .............. *G09G 3/19* (2013.01); *G02F 1/155* (2013.01)

(58) Field of Classification Search
None
See application file for complete search history.

(56) References Cited

U.S. PATENT DOCUMENTS

2009/0219466 A1   9/2009   Kagawa et al.
2009/0303565 A1*  12/2009   Karmhag ............. G02F 1/1533
                                                                 359/265
2021/0026212 A1*  1/2021   Tang ..................... G02F 1/1525

FOREIGN PATENT DOCUMENTS

CN          1476549 A       2/2004
CN        201886236 U       6/2011
(Continued)

OTHER PUBLICATIONS

International Search Report for PCT Application No. PCT/CN2020/136000, dated Feb. 25, 2021, 4 pages.
(Continued)

*Primary Examiner* — Stephone B Allen
*Assistant Examiner* — Tamara Y. Washington
(74) *Attorney, Agent, or Firm* — Dickinson Wright PLLC

(57) ABSTRACT

Electrochromic devices, preparation methods for electrochromic devices, and applications of electrochromic devices. The electrochromic device includes a first conductive layer, a color-changing layer and a second conductive layer that are arranged in succession. At least one first electrode lead is connected on the first conductive layer. The first electrode lead passes through the color-changing layer and the second conductive layer. At least one second electrode lead is connected on the second conductive layer, and the second electrode lead passes through the color-changing layer and the first conductive layer. The electrochromic device can achieve the application of the electrochromic device under the premise that the two conductive layers are not staggered, and on the basis of implementing electrochromism. The technical effect of gradual color change can be achieved by changing the magnitude of the power supply voltage and/or current.

19 Claims, 6 Drawing Sheets

(56) References Cited

FOREIGN PATENT DOCUMENTS

| | | |
|---|---|---|
| CN | 103676391 A | 3/2014 |
| CN | 103901643 A | 7/2014 |
| CN | 105467711 A | 4/2016 |
| CN | 105824163 A | 8/2016 |
| CN | 107045243 A | 8/2017 |
| CN | 107111201 A | 8/2017 |
| CN | 108474990 A | 8/2018 |
| CN | 208737169 U | 4/2019 |
| CN | 110032018 A | 7/2019 |
| CN | 209149026 U | 7/2019 |
| CN | 110908208 A | 3/2020 |
| KR | 20080022321 A | 3/2008 |

OTHER PUBLICATIONS

Search Report for Chinese Application No. 201911305012.4, dated Feb. 22, 2021, 4 pages.
First Office Action for Chinese Application No. 201911305012.4, dated Mar. 2, 2021, 12 pages.

\* cited by examiner

ELECTROCHROMIC DEVICE, PREPARATION METHOD THEREFOR AND APPLICATION THEREOF

CROSS-REFERENCE TO RELATED APPLICATION(S)

This application is a U.S. National Stage Application filed under 37 U.S.C. 371 based on International Patent Application No. PCT/CN2020/136000, filed Dec. 14, 2020, which claims priority to Chinese Patent Application No. 201911305012.4, filed with the China National Intellectual Property Administration (CNIPA) on Dec. 17, 2019, the disclosures of which are incorporated herein by reference in their entireties.

TECHNICAL FIELD

The present application belongs to the electrochromism technical field, and relates to an electrochromic device, a preparation method therefor and application thereof, and in particular to an electrochromic device with the gradual color-changing, a preparation method therefor and application thereof.

BACKGROUND

Electrochromism refers to the phenomenon that the optical properties (reflectivity, transmittance, absorptivity, etc.) of materials undergo stable and reversible color-changing under the action of an external electric field, and its manifestation is the reversible changes in color and transparency. Materials with the electrochromic property are called electrochromic materials, and the devices made of electrochromic materials are called electrochromic devices.

Electrochromic devices, which can perform stable and reversible changes in color and/or transmittance under an external electric field, have a huge application market in intelligent homes and consumer electronics. An electrochromic device usually includes a first conductive layer, an electrochromic layer, an electrolyte layer, an ion storage layer and a second conductive layer.

Currently, the existing electrochromic device usually facilitates the electrode leads to be connected on the conductive layers respectively by arranging the two conductive layers in stagger, so that the electrochromic device is connected with the power supply; in such arranging method, firstly, the first conductive layer and the second conductive layer need to be cut out respectively according to the specific size of the device, and then the conductive layers need to be manually aligned and sticked tightly, and that is, the electrochromic devices need to be sticked tightly one by one. Such process results in the waste of conductive materials, highly increases production costs and labor costs, and is not conducive to mass production and yield improvement, which greatly limits the production capacity.

Additionally, the existing electrochromic device has relatively simplistic color-changing effects, which is hardly able to provide diverse visual experience of gradual color-changing for uses during the color-changing process.

Therefore, there is a need to develop an electrochromic device without requiring the conductive layers arranged in stagger, and the electrochromic device can achieve the effect of gradual color-changing by changing certain conditions.

SUMMARY

An object of the present application is to provide an electrochromic device, a preparation method therefor and an application thereof. The electrochromic device provided by the present application can realize the application of the electrochromic device under the precondition that two conductive layers are not arranged in stagger, and on the basis of achieving electrochromism, the electrochromic device provided by the present application can realize the technical effect of gradual color-changing by altering the size of voltage and/or current output form the power supply.

In a first aspect, the present application provides an electrochromic device, including a first conductive layer, a color-changing layer and a second conductive layer arranged in sequence.

In the electrochromic device, at least one first electrode lead is connected on the first conductive layer, and the first electrode lead passes through the color-changing layer and the second conductive layer.

In the electrochromic device, at least one second electrode lead is connected on the second conductive layer, and the second electrode lead passes through the color-changing layer and the first conductive layer.

In the present application, by leading the electrode lead to pass through the rest two layers apart from one of the conductive layers and then to be connected on the conductive layer, it can be realized to utilize the electrochromic device under the precondition that the two conductive layers are not arranged in stagger. Thereby, in the production process, the large-size electrochromic devices with all layers aligned can be produced in bulk, and then according to size requirement of specific products, the large-size electrochromic devices can be cut into small-size electrochromic devices, greatly improving production efficiency and product yield.

In the present application, a first accommodating portion is arranged on the color-changing layer and the second conductive layer for the first electrode lead to pass through.

A second accommodating portion is arranged on the color-changing layer and the first conductive layer for the second electrode lead to pass through.

Preferably, shapes of the first accommodating portion and the second accommodating portion are identical or different, including any regular or irregular shape, and are selected from a polygon, an ellipse, a sector or a circle.

In the present application, by forming a hole on the color-changing layer and the second conductive layer and then leading the first electrode lead to pass through the hole, it is achieved to connect the first electrode lead to the first conductive layer, and using the same method, it is achieved to connect the second electrode lead to the second conductive layer.

Owing to that the accommodating portion is mainly used to facilitate the electrode lead to be connected on the conductive layer, there is no specific limitation on a shape of the hole (the accommodating portion); the object of the present application can be realized by the accommodating portion with any regular or irregular shape, such as a circle, a triangle, a quadrangle and a pentagon; in view of the operation ease, the circular hole is preferred. Similarly, there is no specific limitation on a size of the accommodating portion, and the size of the accommodating portion can be designed according to the specific size of the electrochromic device in practical applications, as long as it is relatively coordinated with the device size.

For a specific position of the hole, there is a plurality of manner described below.

For the following several technical solutions adopted in the present application, when the voltage and/or current of the power supply connected with the electrode lead is relatively small, the color-changing and utilization of the electrochromic device can be realized; when the voltage and/or current of the power supply is relatively large, the technical effect of gradual color-changing can be realized; the threshold value of the voltage and/or current to realize color-changing or gradual color-changing needs to be analyzed according to specific factors such as materials and area sizes selected by the electrochromic device, and the specific threshold value can be obtained through debugging.

In the following description of the present application, the color-changing and utilization of the electrochromic device will not be described, and only the technical effect of gradual color-changing will be briefly described and analyzed.

Preferably, axes of all the first accommodating portion and the second accommodating portion are located on a same flat surface, a same bended surface, a same cambered surface or a same cylindrical surface.

When the axes of all the first accommodating portion and the second accommodating portion are located on the same flat surface, and that is, in a top view, all the holes are aligned to form a straight line, or by observing from the top view, the straight line formed by all the first accommodating portions can overlap the straight line formed by the second accommodating portions; under such circumstance, the gradual color-changing of the electrochromic device can be realized. When the first electrode lead and the second electrode lead are connected to the positive/negative pole of the power supply, the entire electrochromic device changes from dark to bright, and the color-changing process extends from positions where the electrode leads are arranged to other places, and that is, the straight-line region formed by accommodating portions begins to change to bright firstly, and then other regions gradually change from dark to bright.

And when the first electrode lead and the second electrode lead are connected to the positive/negative pole of the power supply (in a connecting manner that is the inverse of the first circumstance), the entire electrochromic device changes from bright to dark, and the color-changing process extends from positions where the electrode leads are arranged to other places in the same way.

When the axes of all the first accommodating portion and the second accommodating portion are located on the same bended surface, the bended surface can have a shape of "└", a shape of "Π" or the like. Namely, if the electrochromic device is a quadrilateral device, the first accommodating portions and the second accommodating portions may be distributed on two sides of the quadrilateral, and by observing the electrochromic device from a top view, the broken line formed by all the first accommodating portions can overlap the broken line formed by the second accommodating portions. After the power supply is connected, the effect of gradual color-changing can also be achieved; the color-changing effect extends from positions where the electrode leads are arranged to other places, and that is, the broken-line region formed by accommodating portions begins to change firstly, and then other regions gradually change.

When the axes of all the first accommodating portion and the second accommodating portion are located on the same cylindrical surface, if the cylindrical surface is located in a position of the electrochromic device close to the edge, it can be achieved that the color-changing effect is performed from the edge to the center; if the cylindrical surface is located in a position of the electrochromic device close to the center, it can be achieved that the color-changing effect is performed from the center to the edge.

There is another manner to arrange the hole.

Preferably, axes of all the first accommodating portions and the second accommodating portions are located on at least two flat surfaces, and each flat surface includes both part of the first accommodating portions and part of the second accommodating portions.

Preferably, axes of all the first accommodating portions and the second accommodating portions are located on two flat surfaces, in which the axes of part of the first accommodating portions and part of the second accommodating portions are all located on a first flat surface, and the axes of the rest of the first accommodating portions and the rest of the second accommodating portions are all located on a second flat surface.

When axes of all the first accommodating portion and the second accommodating portion are located on two flat surfaces, if the flat surfaces are arranged in parallel, it can be achieved that the color-changing effect begins from two symmetric sides; or the flat surfaces can also be arranged in stagger. In the practical application, the position relation of the two flat surfaces can be selected according to the actual situation.

Preferably, axes of all the first accommodating portions and the second accommodating portions are located on three flat surfaces, in which the axes of a first part of the first accommodating portions and a first part of the second accommodating portions are all located on a first flat surface, the axes of a second part of the first accommodating portions and a second part of the second accommodating portions are all located on a second flat surface, and the axes of the rest of the first accommodating portions and the rest of the second accommodating portions are all located on a third flat surface.

In brief, all the color-changing effects of the electrochromic device finally obtained are performed form the electrode region to other regions, no matter how the first accommodating portion and the second accommodating portion are arranged; the electrode region described in the present application refers to a projection region of the surface (including a flat surface, a bended surface, an cambered surface or a cylindrical surface, etc.) where axes of all the first accommodating portion and the second accommodating portion are located on the surface of the electrochromic device.

In the present application, there is no specific limitation on a distance between the first accommodating portion and the adjacent second accommodating portion (the straight-line distance between axes of the first accommodating portion and the adjacent second accommodating portion), as long as the arrangements of the first accommodating portion and the second accommodating portion have no influence on each other.

For a surface, such as one flat surface, at least two flat surfaces, a cambered surface or a cylindrical surface, where axes of all the first accommodating portion and the second accommodating portion are located, no matter what it might be, there is no specific limitation on a distance between the surface and the edge of the electrochromic device; as long as the application requirement is satisfied.

There is no limitation on a shape of the electrochromic device in the present application; owing to that the electrochromic device provided in the present application does not require two conductive layers to be arranged in stagger, the electrochromic device provided in the present application can be in various shapes, such as a circle, a triangle, a quadrilateral or a pentagon.

In the present application, the first conductive layer and the second conductive layer are both a transparent conductive layer.

There is no limitation on the transparent conductive layer in the present application, as long as the transparent conductive layer satisfies the requirement of transparency and does not affect the color-changing effect of the color-changing layer; for example, the transparent conductive layer can be obtained from the currently commonly used film substrate evaporated with a conductive material; under such circumstance, the transparent conductive layer includes two layers, in which one is a transparent substrate layer and the other is a conductive material layer.

Similarly, there is no limitation on the color-changing layer; any color-changing layer in the prior art which satisfies the conditions of arranging the accommodating portion can be applied to the present application. The color-changing layer described in the present application may be based on either electrochromism or any other dimming technology. Several color-changing layers are listed below as examples.

I. A currently commonly used three-layer material; namely, the color-changing layer is composed of an electrochromic layer, an electrolyte layer and an ion storage layer arranged in sequence; actually, there is no essential difference whether the electrochromic layer is located on a side close to a first conductive layer or on a side close to a second conductive layer; the expression of the first conductive layer and the second conductive layer in the present application is not aimed at limitation, but distinction merely.

II. A currently commonly used one-layer material; namely, the color-changing layer has a composition including an electrolyte, an electrochromic material and an ion storage material.

III. Liquid crystals composite layer (PDLC); namely, the color-changing layer has a composition including liquid crystal suspended particles, and when electricity is applied, the color-changing layer can be subjected to a transition from opaque to transparent or other processes.

IV. Nano composite layer (SPD); namely, the color-changing layer has a composition including nano suspended particles, and when electricity is applied, the color-changing layer can be subjected to a transition from opaque to transparent or other processes.

The most commonly used type I color-changing layer is taken as an example to describe in the present application.

In the present application, there is no limitation on the electrode lead; for example, materials of the first electrode lead and the second electrode lead are identical or different, and the first electrode lead and the second electrode lead are each independently selected from copper foil, aluminum foil, nickel foil, alloy conductive foil, conductive silver paste or conductive graphene.

A first transparent protective layer and a second transparent protective layer are further included, the first transparent protective layer covers on the outer side of the first conductive layer, and the second transparent protective layer covers on the outer side of the second conductive layer.

For the transparent protective layer, the function is to be transparent and protective, and thus there is no limitation on a material of the transparent protective layer; for example, transparent glass or transparent plastic materials such as Acrylic, PE, PP, PU or the like can all satisfy the application requirement.

Preferably, a first shielding layer is further included, and the first shielding layer covers on the outer side of the first conductive layer.

When the electrochromic device does not include the protective layer, the shielding layer directly covers on the outer side of the conductive layer; when the electrochromic device include the protective layer, the shielding layer can be arranged between the conductive layer and the protective layer, or can be arranged on the outer side of the protective layer.

The shielding layer in the present application is used to, on the one hand, divide the color-changing region, giving the electrochromic device a visual effect of separate color-changing; on the other hand, the shielding layer is used to shield the electrode-wiring region, facilitating the electrochromic device to be more beautiful visually; for example, when the electrode region is located at the edge of the electrochromic device (all accommodating parts are located at the edge), under this circumstance, the first shielding layer can be designed to be black at the edge and transparent in the rest region, which gives the effect of shielding wiring without affecting the color-changing effect of the electrochromic device (gradual color-changing effect).

In a second aspect, the present application provides a preparation method for the electrochromic device according to the first aspect, including the following steps:

(1) arranging at least one first accommodating portion on the color-changing layer and the second conductive layer of the electrochromic device, and then leading the first electrode lead to pass through the first accommodating portion and to be connected on the first conductive layer; and (2) arranging at least one second accommodating portion on the color-changing layer and the first conductive layer of the electrochromic device, and then leading the second electrode lead to pass through the second accommodating portion and to be connected on the second conductive layer, so as to obtain the electrochromic device.

Preferably, in the preparation method, a method for arranging an accommodating portion comprises a mechanical cutting method or a laser cutting method.

The accommodating portion includes all the accommodating portions including the first accommodating portion and the second accommodating portion.

Preferably, the method for arranging an accommodating portion includes that firstly applying mechanical cutting or laser cutting, and then performing mechanical cleaning or laser cleaning, so as to obtain the accommodating portion.

Preferably, in the preparation method, a method for connecting the electrode lead on the conductive layer includes sticking or dispensing.

The term "dispensing" in the present application refers to depositing a conductive adhesive on the conductive layer by means of dispensing, and the term "sticking" refers to attaching the conductive film to the conductive layer.

The connection described above between the electrode lead and the conductive layer specifically includes that the first electrode lead is connected on the first conductive layer, and the second electrode lead is connected on the second conductive layer.

In a third aspect, the present application provides an electrochromic module, and the electrochromic module is prepared by splicing at least two electrochromic devices according to the first aspect.

Preferably, a third transparent protective layer and a fourth transparent protective layer are further included, the third transparent protective layer covers on the outer side of the first conductive layer, and the fourth transparent protective layer covers on the outer side of the second conductive layer.

Preferably, a second shielding layer is further included, and the second shielding layer covers on the outer side of the first conductive layer.

Preferably, the second shielding layer covers on the outer side of the third transparent protective layer.

In a fourth aspect, the present application provides an application of the electrochromic device according to the first aspect or the electrochromic module according to the third aspect in architectural glass, vehicle glass, vehicle rearview mirror, high-speed rail glass, aircraft glass, subway glass, consumer electronics or eyewear.

Compared with the prior art, the present application has the beneficial effect described below.

(1) In the present application, by leading the electrode lead to pass through the rest four layers apart from the conductive layer and then to be connected on the conductive layer, it can be realized to utilize the electrochromic device under the precondition that the two conductive layers are not arranged in stagger while improving production efficiency and product yield.

(2) In the present application, by limiting the accommodating portion to a specific position, and by adjusting the size of voltage and/or current output form the power supply connected to the electrode lead, the interconvertible transition between different technical effects can be realized, including the common color-changing or gradual color-changing of the electrochromic device, effectively meeting the diverse needs of consumers.

BRIEF DESCRIPTION OF DRAWINGS

In FIG. 1, 1—the first conductive layer; 11—the first transparent substrate layer; 12—the first conductive material layer; 2—the electrochromic layer; 3—the electrolyte layer; 4—the ion storage layer; 5—the second conductive layer; 51—the second transparent substrate layer; 52—the second conductive material layer; 71—the first electrode lead; and 72—the second electrode lead.

In those figures, 61—the first accommodating portion; and 62—the second accommodating portion.

Figure 12:
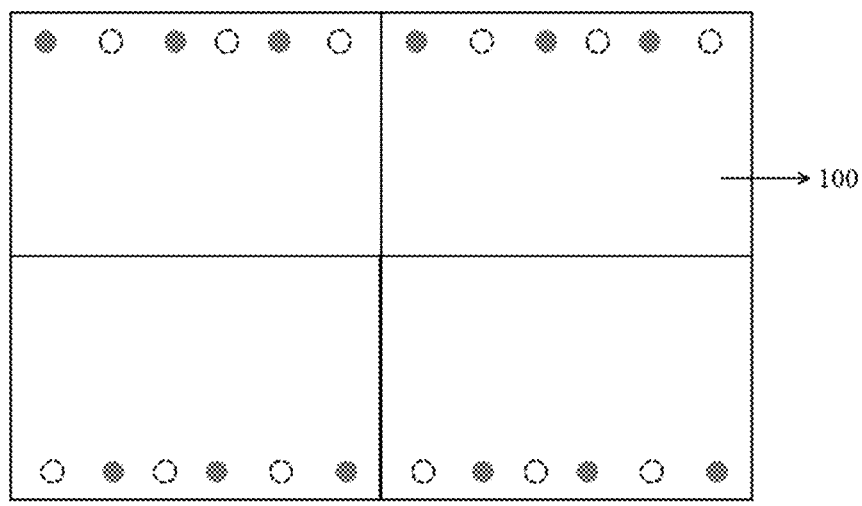

FIG. 12 is a schematic structural diagram showing the electrochromic module provided in Application Example 1.

Figure 13:
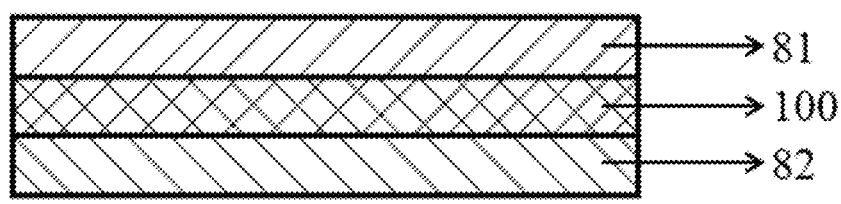

FIG. 13 is another schematic structural diagram showing the electrochromic module provided in Application Example 1.

In FIG. 13, 81—the third transparent glass layer; 82—the fourth transparent glass layer; and 100—the electrochromic device provided in Example 1.

Figure 14:
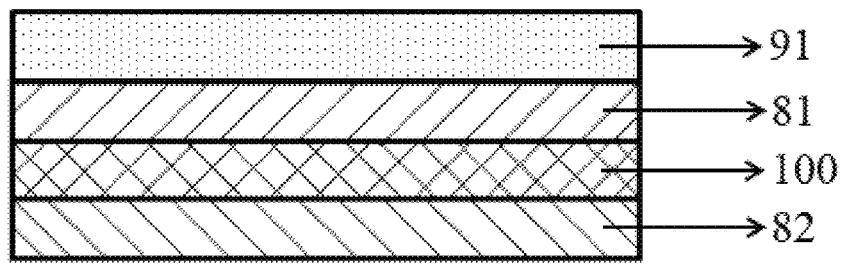

FIG. 14 is a schematic structural diagram showing the electrochromic module provided in Application Example 2.

Figure 15:
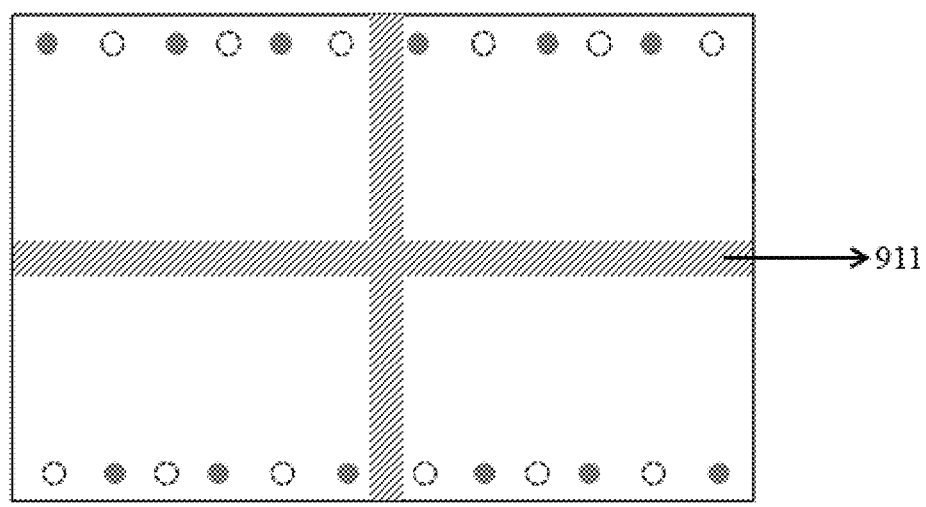

FIG. 15 is another schematic structural diagram showing the electrochromic module provided in Application Example 2.

In those figures, 91—the shielding layer; and 911—the black part.

DETAILED DESCRIPTION

The technical solution of the present application is further described below through specific embodiments. It should be apparent to those skilled in the art that the embodiments described herein are only used for a better understanding of the present application, and should not be construed as a specific limitation to the present application.

The embodiments, in which the specific techniques or conditions are not specified, are performed according to the techniques or conditions described in the literature in the field or according to the product specification. The reagents or instruments used, whose manufacturer are not specified, are all conventional products that can be commercially purchased through regular channels.

Example 1

Figure 1:
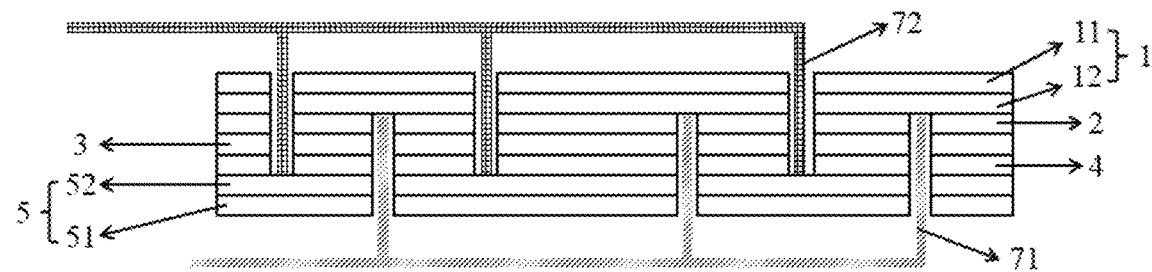
FIG. 1 is a schematic cross-sectional view of the electrochromic device provided in Example 1.

This example provides an electrochromic device, as shown in FIG. 1, including a first conductive layer 1, an electrochromic layer 2, an electrolyte layer 3, an ion storage layer 4 and a second conductive layer 5 arranged in sequence.

In this example, the first conductive layer 1 was composed of a first transparent substrate layer 11 and a first conductive material layer 12, and was a transparent ITO conductive glass, having a thickness of 0.125 mm.

In this example, a color-changing layer was composed of the electrochromic layer, the electrolyte layer and the ion storage layer.

The electrochromic layer 2 was poly(ethylhexane)propyldioxythiophene of 15 KDa, having a thickness of 200 nm.

In this example, the electrolyte layer 3 was the PEO dissolved by 25 wt % $LiClO_4$, having a thickness of 10 μm.

In this example, the ion storage layer 4 was tungsten trioxide, having a thickness of 200 nm.

In this example, the second conductive layer 5 was composed of a second transparent substrate layer 51 and a second conductive material layer 52, and was a transparent ITO conductive glass, having a thickness of 0.180 mm.

In this example, three first accommodating portions were arranged on the electrochromic layer 2, the electrolyte layer 3, the ion storage layer 4 and the second conductive layer 5, and then first electrode leads 71 were connected on the first conductive layer 1 passing through the first accommodating portions.

In this example, three second accommodating portions were arranged on the ion storage layer 4, the electrolyte layer 3, the electrochromic layer 2 and the first conductive layer 1, and then second electrode leads 72 were the second conductive layer 5 passing through the second accommodating portions.

Figure 2:
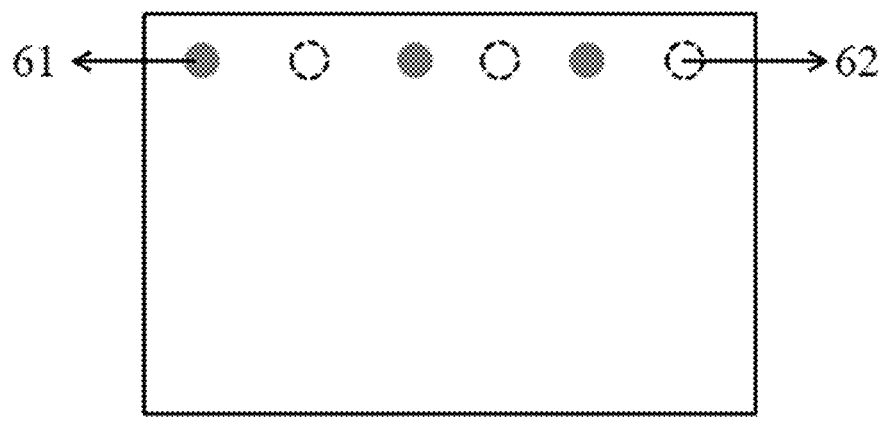
FIG. 2 is a schematic structural diagram showing the specific position of the first accommodating portion and the second accommodating portion in Example 1.

In this example, as shown in FIG. 2, all the first accommodating portions and the second accommodating portions were circles with a diameter of 5 mm, of which the axes were located on the same flat surface, and the flat surface was located at one side of the electrochromic device 10 mm close to the edge.

For subjecting the electrochromic device provided in this example to application, taken the technical effect of gradual color-changing as an example, the detail method is described below.

The first electrode leads were connected to the positive pole of a power supply, and the second electrode leads were connected to the negative pole of the power supply. After the power supply was turned on, the entire electrochromic device changed from dark to bright. The color-changing process extended from positions where the electrode leads were arranged to other places, and that is, the straight-line region formed by accommodating portions began to change to bright firstly, and then other regions gradually changed from dark to bright.

Or the first electrode leads were connected to the negative pole of a power supply, and the second electrode leads were connected to the positive pole of the power supply. After the power supply was turned on, the entire electrochromic device changed from bright to dark. The color-changing process extended from positions where the electrode leads were arranged to other places, and that is, the straight-line region formed by accommodating portions began to change to dark firstly, and then other regions gradually changed from bright to dark.

Example 1-2

This example differs from Example 1 only in that all the accommodating portions in this example were squares, and the side length was 10 mm.

Example 1-3

In order to illustrate that the structure in the present application is suitable for an electrochromic device in the prior art that satisfies the requirement of forming holes, several examples are listed.
  a. The conductive layer was PET/ITO, the electrochromic layer was $WO_3$, the electrolyte layer was $LiTaO_3$, and the ion storage layer was $NiO_x$.
  b. The conductive layer was glass/ITO, the electrochromic layer was $WO_3$, the electrolyte layer was polyvinyl butyral containing 25 vol. % propylene carbonate, and the ion storage layer was $NiO_x$.
  c. The conductive layer was PET/ITO, the electrochromic layer was P3HT, the electrolyte layer was PEO dissolving $LiClO_4$, and the ion storage layer was poly4-methacrylic acid-2,2,6,6-tetramethylpiperidine-1-nitroxide (free radical).

Example 2

Figure 3:
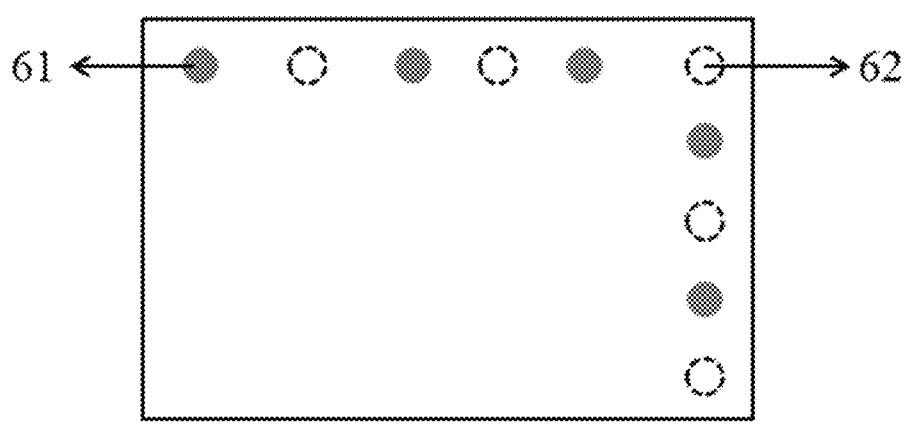
FIG. 3 is a schematic structural diagram showing the specific position of the first accommodating portion and the second accommodating portion in Example 2.

This example differs from Example 1 in that, as shown in FIG. 3, five first accommodating portions and five second accommodating portions were arranged in this example, and the axes of all the first accommodating portions and the second accommodating portions were located on the same bended surface, and the bended surface was located at two sides of the electrochromic device close to the edge.

Example 3

Figure 4:
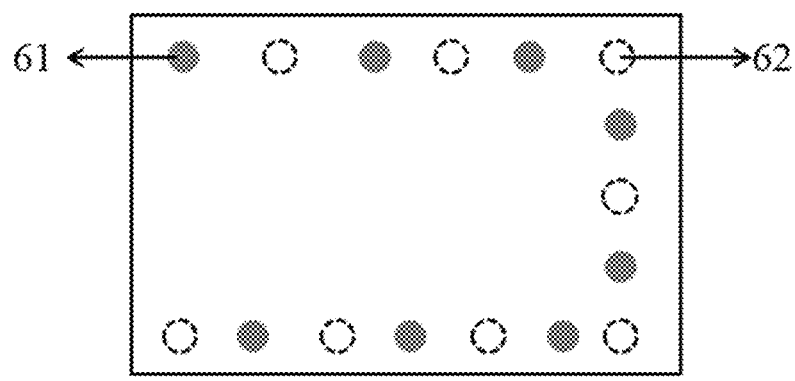
FIG. 4 is a schematic structural diagram showing the specific position of the first accommodating portion and the second accommodating portion in Example 3.

This example differs from Example 2 in that, as shown in FIG. 4, eight first accommodating portions and eight second accommodating portions were arranged in this example, and the axes of all the first accommodating portions and the second accommodating portions were located on the same bended surface, and the bended surface was located at three sides of the electrochromic device close to the edge.

Example 4

Figure 5:
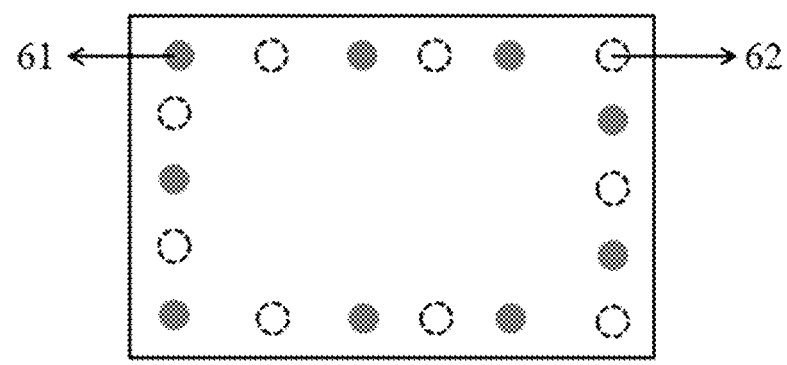
FIG. 5 is a schematic structural diagram showing the specific position of the first accommodating portion and the second accommodating portion in Example 4.

This example differs from Example 2 in that, as shown in FIG. 5, nine first accommodating portions and nine second accommodating portions were arranged in this example, and the axes of all the first accommodating portions and the second accommodating portions were located on the same bended surface, and the bended surface was located at four sides of the electrochromic device close to the edge.

Example 5

Figure 6:
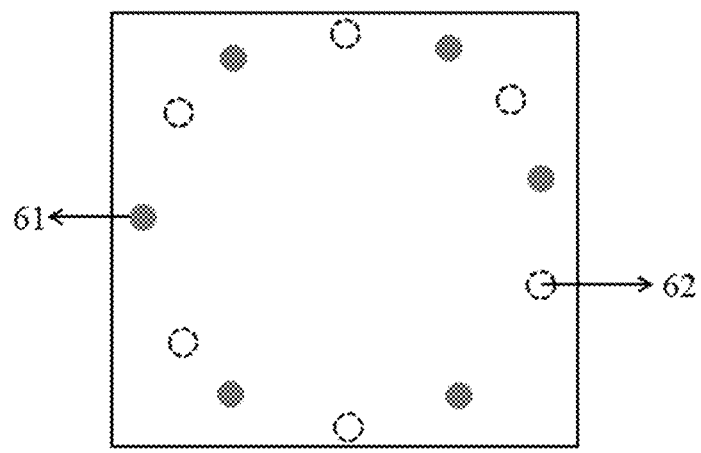
FIG. 6 is a schematic structural diagram showing the specific position of the first accommodating portion and the second accommodating portion in Example 5.

This example differs from Example 1 in that, as shown in FIG. 6, six first accommodating portions and six second accommodating portions were arranged in this example, and the axes of all the first accommodating portions and the second accommodating portions were located on the same cylindrical surface, and the cylindrical surface was located in a position of the electrochromic device close to the edge.

Example 6

Figure 7:
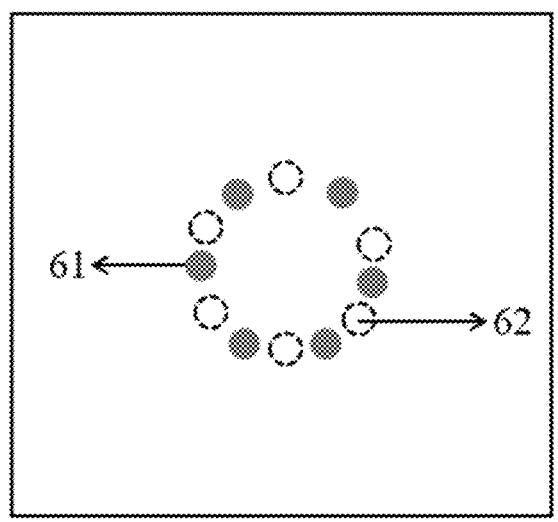
FIG. 7 is a schematic structural diagram showing the specific position of the first accommodating portion and the second accommodating portion in Example 6.

This example differs from Example 5 in that, as shown in FIG. 7, the axes of all the first accommodating portions and the second accommodating portions were located on the same cylindrical surface, and the cylindrical surface was located in a position of the electrochromic device close to the center.

Example 7

Figure 8:
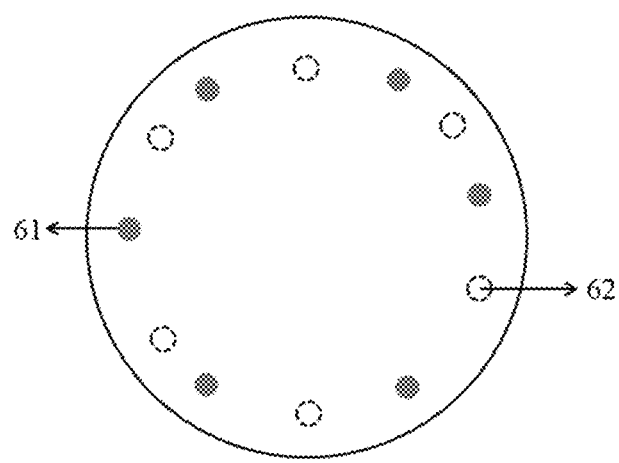
FIG. 8 is a schematic structural diagram showing the specific position of the first accommodating portion and the second accommodating portion in Example 7.

This example differs from Example 5 in that, as shown in FIG. 8, the electrochromic device of this example was a circular device.

Example 8

Figure 9:
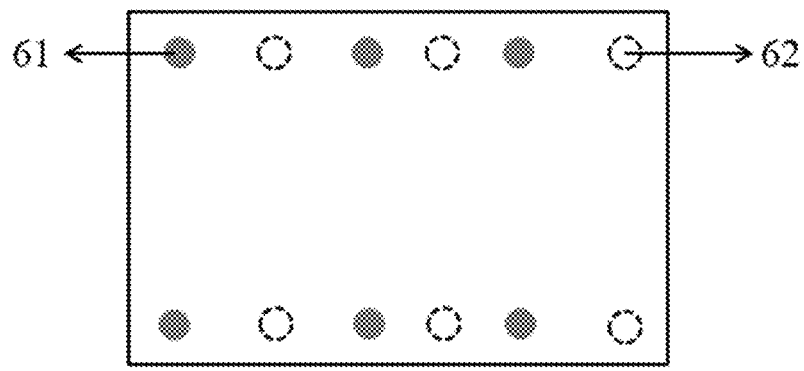
FIG. 9 is a schematic structural diagram showing the specific position of the first accommodating portion and the second accommodating portion in Example 8.

This example differs from Example 1 in that, as shown in FIG. 9, six first accommodating portions and six second accommodating portions were arranged in this example, and the axes of all the first accommodating portions and the second accommodating portions were located on two flat surfaces separately; the two line segments, which were formed by the projections of the two flat surfaces where the first accommodating portions and the second accommodating portions were located on the surface of the electrochromic device, were located at two sides of the electrochromic device close to the edge respectively, and were arranged in parallel.

Example 9

Figure 10:
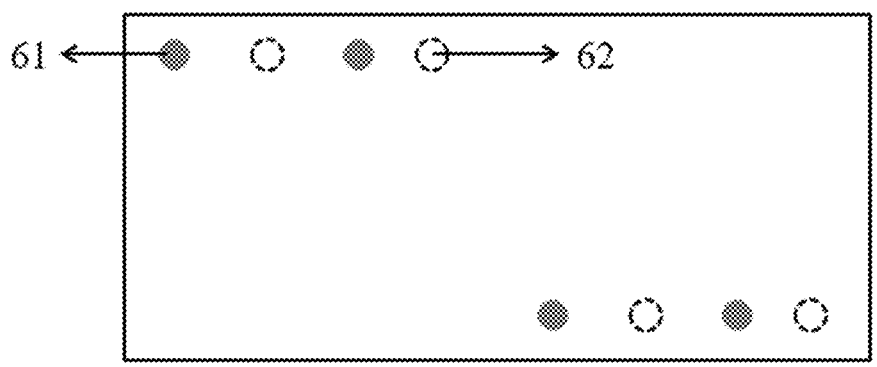
FIG. 10 is a schematic structural diagram showing the specific position of the first accommodating portion and the second accommodating portion in Example 9.

This example differs from Example 8 in that, as shown in FIG. 10, four first accommodating portions and four second accommodating portions were arranged in this example, and the axes of all the first accommodating portions and the second accommodating portions were located on two flat surfaces; the two line segments, which were formed by the projections of the two flat surfaces where the first accommodating portions and the second accommodating portions were located on the surface of the electrochromic device, were located at two sides of the electrochromic device close to the edge respectively, and were arranged in stagger.

Example 10

Figure 11:
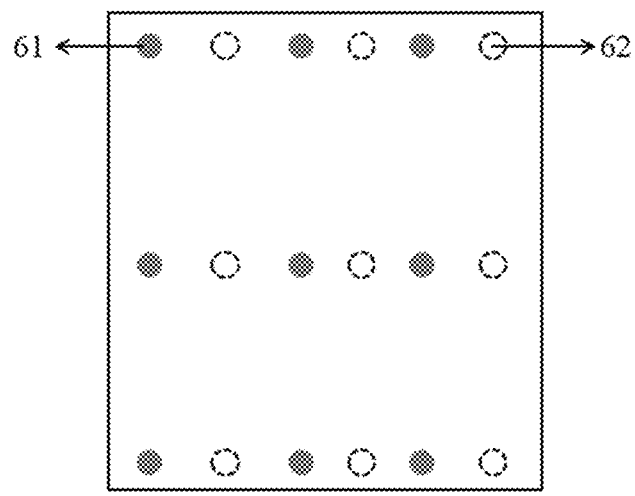
FIG. 11 is a schematic structural diagram showing the specific position of the first accommodating portion and the second accommodating portion in Example 10.

This example differs from Example 1 in that, as shown in FIG. 11, nine first accommodating portions and nine second accommodating portions were arranged in this example, and the axes of all the first accommodating portions and the second accommodating portions were located on three flat surfaces; the three flat surfaces were arranged in parallel, and were respectively located at the two sides of the electrochromic device close to the edge, and in the middle position of the electrochromic device.

Application Example 1

An electrochromic module, as shown in FIG. 12, was prepared by splicing four electrochromic devices 100 provided in Example 1.

In this example, as shown in FIG. 13, the electrochromic module further included a third transparent glass layer 81 and a fourth transparent glass layer 82. The third transparent glass layer 81 was bonded to the first conductive layer by a transparent binder film, and was located on the outer side of the first conductive layer. The fourth transparent glass layer 82 was bonded to the first conductive layer by a transparent binder film, and was located on the outer side of the second conductive layer.

The preparation method included that: a transparent binder film was placed on the fourth transparent glass layer 82; a plurality of electrochromic devices 100 were placed as close as possible to each other, and were arranged as the structure shown in FIG. 12; then another transparent binder film was placed on the upper surface of the spliced electrochromic device 100, and the third transparent glass layer 81 was placed; and pressing was performed.

Application Example 2

This application example differs from Application Example 1 in that, as shown in FIG. 14, the electrochromic module further included a shielding layer 91, and the shielding layer 91 was covered on the outer side of a third transparent glass layer, and those two layers were bonded by a transparent binder film.

In this example, as shown in FIG. 15, the shielding layer 91 was composed of a black part 911 and a transparent part, wherein the black part had a function of shielding the splicing line and had an effect of partitioning visually.

The applicant has stated that although the electrochromic device, the preparation method therefor and application thereof in the present application are illustrated through the examples described above in the present application, the present application is not limited to the processes and steps described above, which means that the implementation of the present application does not necessarily depend on the processes and steps described above. It should be apparent to those skilled in the art that any improvements made to the present application, equivalent replacements of raw materials selected in the present application and addition of adjuvant ingredients thereof, selections of specific methods, etc., all fall within the protection scope and the disclosed scope of the present application.

What is claimed is:

1. An electrochromic device, comprising a first conductive layer, a color-changing layer and a second conductive layer arranged in sequence;
   wherein at least one first electrode lead is connected on the first conductive layer, and the first electrode lead passes through the color-changing layer and the second conductive layer; and
   wherein at least one second electrode lead is connected on the second conductive layer, and the second electrode lead passes through the color-changing layer and the first conductive layer;
   wherein a first accommodating portion is arranged on the color-changing layer and the second conductive layer for the first electrode lead to pass through; a second accommodating portion is arranged on the color-changing layer and the first conductive layer for the second electrode lead to pass through; and
   wherein a straight line formed by a projection of all the first accommodating portion on the surface of the electrochromic device that overlaps a straight line formed by a projection of all the second accommodating portion on the surface of the electrochromic device, or
   wherein a broken line formed by a projection of all the first accommodating portion on the surface of the electrochromic device that overlaps a broken line formed by a projection of all the second accommodating portion on the surface of the electrochromic device.

2. The electrochromic device according to claim 1, wherein shapes of the first accommodating portion and the second accommodating portion are identical or different, and are each independently selected from any regular or irregular shape.

3. The electrochromic device according to claim 1, wherein shapes of the first accommodating portion and the second accommodating portion are identical or different, and are each independently selected from a polygon, an ellipse, a sector or a circle.

4. The electrochromic device according to claim 2, wherein axes of all the first accommodating portion and the second accommodating portion are located on a same flat surface, a same bended surface, a same cambered surface or a same cylindrical surface.

5. The electrochromic device according to claim 2, wherein axes of all the first accommodating portions and the second accommodating portions are located on at least two flat surfaces, and each flat surface comprises both part of the first accommodating portions and part of the second accommodating portions; or
   axes of all the first accommodating portions and the second accommodating portions are located on two flat surfaces, wherein the axes of part of the first accommodating portions and part of the second accommodating portions are all located on a first flat surface, and the axes of the rest of the first accommodating portions and the rest of the second accommodating portions are all located on a second flat surface; or axes of all the first accommodating portions and the second accommodating portions are located on three flat surfaces, wherein the axes of a first part of the first accommodating portions and a first part of the second accommodating portions are all located on a first flat surface, the axes of a second part of the first accommodating portions and a second part of the second accommodating portions are all located on a second flat surface, and the axes of the rest of the first accommodating portions and the rest of the second accommodating portions are all located on a third flat surface.

6. The electrochromic device according to claim 3, wherein axes of all the first accommodating portion and the second accommodating portion are located on a same flat surface, a same bended surface, a same cambered surface or a same cylindrical surface.

7. The electrochromic device according to claim 3, wherein axes of all the first accommodating portions and the second accommodating portions are located on at least two flat surfaces, and each flat surface comprises both part of the first accommodating portions and part of the second accommodating portions; or axes of all the first accommodating portions and the second accommodating portions are located on two flat surfaces, wherein the axes of part of the first accommodating portions and part of the second accommodating portions are all located on a first flat surface, and the axes of the rest of the first accommodating portions and the rest of the second accommodating portions are all located on a second flat surface; or axes of all the first accommodating portions and the second accommodating portions are located on three flat surfaces, wherein the axes of a first part of the first accommodating portions and a first part of the second accommodating portions are all located on a first flat surface, the axes of a second part of the first accommodating portions and a second part of the second accommodating portions are all located on a second flat surface, and the axes of the rest of the first accommodating portions and the rest of the second accommodating portions are all located on a third flat surface.

8. The electrochromic device according to claim 1, wherein the first conductive layer and the second conductive layer are both a transparent conductive layer; and/or materials of the first electrode lead and the second electrode lead are identical or different, and the first electrode lead and the second electrode lead are each independently selected from copper foil, aluminum foil, nickel foil, alloy conductive foil, conductive silver paste, metal conductive filament, conductive cloth or conductive graphene.

9. The electrochromic device according to claim 1, wherein the electrochromic device further comprises a first transparent protective layer and a second transparent protective layer, the first transparent protective layer covers on the outer side of the first conductive layer, and the second transparent protective layer covers on the outer side of the second conductive layer.

10. The electrochromic device according to claim 1, wherein the electrochromic device further comprises a first shielding layer, and the first shielding layer covers on the outer side of the first conductive layer;

optionally, the first shielding layer covers the outer side of the first transparent protective layer.

11. A preparation method for the electrochromic device according to claim 1, comprising the following steps:

arranging the first accommodating portion on the color-changing layer and the second conductive layer of the electrochromic device, and then leading the first electrode lead to pass through the first accommodating portion and to be connected on the first conductive layer; and arranging the second accommodating portion on the color-changing layer and the first conductive layer of the electrochromic device, and then leading the second electrode lead to pass through the second accommodating portion and to be connected on the second conductive layer, so as to obtain the electrochromic device.

12. The preparation method according to claim 11, wherein a method for arranging an accommodating portion comprises a mechanical cutting method or a laser cutting method;

optionally, the method for arranging an accommodating portion comprises that firstly applying mechanical cutting or laser cutting, and then performing mechanical cleaning or laser cleaning, so as to obtain the accommodating portion.

13. The preparation method according to claim 12, wherein in the preparation method, a method for connecting the electrode lead on the conductive layer comprises sticking or dispensing.

14. An electrochromic module, wherein the electrochromic module is prepared by splicing at least two electrochromic devices according to claim 1.

15. The electrochromic module according to claim 14, wherein the electrochromic module further comprises a third transparent protective layer and a fourth transparent protective layer, the third transparent protective layer covers on the outer side of the first conductive layer, and the fourth transparent protective layer covers on the outer side of the second conductive layer.

16. The electrochromic module according to claim 15, wherein the electrochromic module further comprises a second shielding layer, and the second shielding layer covers on the outer side of the first conductive layer;

optionally, the second shielding layer covers on the outer side of the third transparent protective layer.

17. The electrochromic module according to claim 14, wherein the electrochromic module further comprises a second shielding layer, and the second shielding layer covers on the outer side of the first conductive layer;

optionally, the second shielding layer covers on the outer side of the third transparent protective layer.

18. The electrochromic device according to claim 1, wherein the first conductive layer and the second conductive layer are both a transparent conductive layer; and/or materials of the first electrode lead and the second electrode lead are identical or different, and the first electrode lead and the second electrode lead are each independently selected from copper foil, aluminum foil, nickel foil, alloy conductive foil, conductive silver paste, metal conductive filament, conductive cloth or conductive graphene.

19. The electrochromic device according to claim 1, wherein the electrochromic device further comprises a first transparent protective layer and a second transparent protective layer, the first transparent protective layer covers on an outer side of the first conductive layer, and the second transparent protective layer covers on an outer side of the second conductive layer.

\* \* \* \* \*